US011318500B2

(12) United States Patent
Harris et al.

(10) Patent No.: US 11,318,500 B2
(45) Date of Patent: May 3, 2022

(54) METHOD AND APPARATUS FOR IDENTIFYING ARTICLES WITH A LUMINESCENT MARKER FOR RECYCLING

(71) Applicant: Brunel University London, Uxbridge Middlesex (GB)

(72) Inventors: Paul Gregory Harris, Uxbridge Middlesex (GB); George Robert Fern, Uxbridge Middlesex (GB); Jack Silver, Uxbridge Middlesex (GB)

(73) Assignee: Brunel University London

( * ) Notice: Subject to any disclaimer, the term of this patent is extended or adjusted under 35 U.S.C. 154(b) by 164 days.

(21) Appl. No.: 16/605,964

(22) PCT Filed: Apr. 19, 2018

(86) PCT No.: PCT/GB2018/051032
§ 371 (c)(1),
(2) Date: Oct. 17, 2019

(87) PCT Pub. No.: WO2018/193261
PCT Pub. Date: Oct. 25, 2018

(65) Prior Publication Data

US 2020/0038915 A1 Feb. 6, 2020

(30) Foreign Application Priority Data

Apr. 20, 2017 (GB) ..................................... 1706291

(51) Int. Cl.
*B07C 5/342* (2006.01)
*G01N 21/64* (2006.01)
*B07C 5/34* (2006.01)

(52) U.S. Cl.
CPC .......... *B07C 5/3412* (2013.01); *B07C 5/3427* (2013.01)

(58) Field of Classification Search
CPC ................ B07C 5/3412; B07C 5/3427; B07C 2501/0054
USPC ....................................................... 209/3, 3.3
See application file for complete search history.

(56) References Cited

U.S. PATENT DOCUMENTS 5,419,438 A * 5/1995 Squyres .................. B29B 17/02 209/3.1
2006/0001007 A1* 1/2006 Fukui ................. C09K 11/7706 252/301.4 F
2006/0160462 A1* 7/2006 Schneck ............... B07C 5/3427 446/219

OTHER PUBLICATIONS

PCT International Search Report and Written Opinion, dated Sep. 17, 2018.

* cited by examiner

*Primary Examiner* — Michael McCullough
*Assistant Examiner* — Molly K Devine
(74) *Attorney, Agent, or Firm* — Craig A. Fieschko, Esq.; DeWitt LLP

(57) ABSTRACT

The composition of articles can be identified using luminescent codes printed or coated onto the articles (or labels on the articles) by means of an ink which contains long persistence luminescent materials. Radiation is used to excite the luminescent materials and this is then extinguished before the article passes beneath a spectrometer. An infrared beam then strikes the article in order to stimulate emission from the long persistence luminescent materials, via a detrapping mechanism, and the spectrometer detects the emission in order to identify the article.

17 Claims, 2 Drawing Sheets

METHOD AND APPARATUS FOR IDENTIFYING ARTICLES WITH A LUMINESCENT MARKER FOR RECYCLING

FIELD OF THE INVENTION

The field of the invention is the sorting of waste polymeric articles into their different compositional types prior to their recycling and reuse of the materials.

BACKGROUND TO THE INVENTION

Polymeric articles, such as bottles, containers etc., must be sorted into their different compositional types before they can be recycled. This is done at present using near infrared spectroscopy (NIR). A typical process is illustrated in FIG. 1, and consists of passing the articles down conveyor 1, typically at ~3 m/s. Towards the end of conveyor 1 they pass beneath a rotationally minor illumination/analysis equipment where they are repeatedly scanned by a beam of infrared radiation. The infrared radiation scattered from the articles contains the NIR absorption spectrum of the material which is characteristic of the polymer. The scattered infrared is transmitted to a spectrometer for analysis via the same rotating mirror assembly used for scanning the infrared beam, and therefore the analyses are able to identify the composition of the article and to correlate this with its position on the belt, so that air-jets can then eject articles into the correct recovery bin for their particular polymer type.

This technique is operated world-wide and has been successful. It does, however, have notable deficiencies. NIR is unable to identify heavily pigmented articles, which constitute a significant fraction of the waste stream. The problem stems from the scattering of the infrared radiation by the pigment particles before significant absorption has occurred, so that the articles are simply not detected. These undetectable articles cannot be easily identified and often end up in land-fill.

NIR is also not able to tell whether the article has been used for a food-grade application or for a toxic one such for pesticides and it would be beneficial if these two types of usages could be reliably separated.

The concept of using UV fluorescent materials for sorting prior to recycling has been in public domain for nearly 25 years now (see for example Ahmad, S. R., 'Partners wanted for polymer research project', *Mater. Recycl. Weekly* (*UK*), August 8, pp. 14 (1992)).

Attempts have been made in the past to improve the sorting performance by writing codes on plastic articles using mixtures of luminescent materials that emit at various wavelengths across the visible-near infrared spectrum. For example, WO 2015/036719 (Arts et al.) describes using either a scanned UV laser or possibly an infrared laser to excite either UV-excitable Stokes phosphors or infrared-excitable anti-Stokes phosphors. This approach has notable disadvantages. Anti-Stokes (up-shifting) phosphors require at least two photons to be absorbed within a very short time period to excite a single luminescent photon. Their efficiency is therefore quite low, and non-linearly related to the exciting intensity. To be successful they require high intensity infrared radiation. High intensity beams of non-visible UV or infrared radiation are both expensive to generate and pose a substantial health and safety risk to operators of the plant. Many articles in the recycle waste have reflective (e.g. metallised) surfaces, and these would scatter the high intensity beams in all directions. Providing sufficient shielding to permit safe operation or requiring staff to wear full protective gear would be an onerous. As described in this patent the process requires a stand-alone luminescent detection system, which would be expensive to install.

U.S. Pat. No. 8,960,028 (Lambert) discloses the use of phosphors as tracers on articles, but in this case the method of recording the resulting spectra is not compatible with high-speed sorting operations.

Other background art is disclosed in U.S. Pat. No. 3,305,089 A (Fraenkel) and DE 4433937 A1 (Huonker).

There is a need for an improved method of sorting plastics materials for recycling.

Phosphor codes may be written onto articles during their manufacture and these codes contain information regarding both the composition and usage of the article. The key advantage of the approach is that the existing high-speed NIR spectrometers are usually able to detect visible-near-infrared luminescent emissions and so the process requires minimal additional capital investment. The codes can unambiguously indicate both material type and the usage, even on heavily pigmented articles. Moreover, the luminescent codes can be read at the same time as the NIR data, and so the two sources of information are supplemental, and not mutually exclusive.

Trials of this process have been conducted on commercial sorting lines and have been highly successful. Arrays of UV LEDs emitting at 365 nm have been placed in front of the detection zone and the luminescent signatures so induced successfully read using the existing spectrometer.

Although successful these trials have highlighted serious problems that exist with the existing phosphor coding process that limit its scope. Many polymers and paper labels are doped with optical brightening agents (OBA) and these are excited by UV-A and typically luminesce between 400-520 nm (violet-blue-green) which limits the range of the visible spectrum that can be used for writing luminescent codes. Many laundry products have OBAs added to them, to enhance their whitening performance. Since many of these are in powder or liquid form they can contaminate other articles and the conveyor belt itself. Moreover, some products are themselves doped or coated with luminescent materials that emit in other parts of the spectrum such as in the red and these interfere with the analyses. Hereafter these luminescence sources (which are not used for coding purposes) will be referred to as stray luminescences. These stray luminescences may make more than half of the visible spectrum unusable for this application and result in false readings and thus incorrect identification of article composition, and this can be damaging to the recycling process.

The first problem to be addressed is how to prevent these stray luminescence sources from interfering with the reading of the intentionally added luminescent codes.

The second problem is that the use of intense sources of UV radiation is a health hazard for operatives who work in recycling plants and will potentially be exposed to scattered UV for substantial periods of time, which can cause, erythema, premature skin ageing and skin cancer.

The European Optical Radiation 2006/25/EC Directive defines the maximum levels of radiation that workers may be exposed to. It is based on exposure limit values defined by the International Commission on Non-Ionising Radiation Protection (ICNIRP). This defines a maximum permissible effective radiant exposure to UV-A, within an 8 hour period per day for the unprotected skin and eye of only 30 $J/m^2_{eff}$. To put this into perspective such exposures can be achieved by short periods in natural sunlight, yet alone exposure to high intensity UV sources. To comply with these regulations, as mentioned above, therefore would necessitate either the conveyor belt system to be enclosed so that workers are not exposed and/or they must be given full personal protective equipment (goggles, skin coverage). Both of these measures are onerous to the operators.

The last problem to be addressed is that it is undesirable for the phosphor materials to be carried forward in the waste stream. To this end it is best that the phosphor inks are printed onto the articles label rather than onto the article itself, because the labels are removed prior to recycling. In practice, however, a small fraction of the labels are not successfully removed and remain with the material to be recycled. A means of reducing potential contamination from this source is needed.

SUMMARY OF THE INVENTION

In a first aspect of the present invention, there is disclosed a method for identifying an article marked with a luminescent marker, including carrying out the following steps in order:

(a) providing an article marked with a luminescent marker which identifies said article, (b) exciting the marker with a first type of electromagnetic radiation in order to store luminescence in said marker, (c) ceasing said exciting step, (d) waiting for a period of time, (e) applying a second type of electromagnetic radiation to the marker in order to release said stored luminescence, and (f) detecting said released luminescence in order to identify said article.

The method enables energy to be stored in a luminescent marker (preferably one or more phosphor markers) and then that energy to be released (in a short window as it passes under the detector) so that as much as possible of it is collected.

In a preferred embodiment, the first type of electromagnetic radiation has a wavelength from 200 nm to 700 nm. The second type of electromagnetic radiation preferably has a wavelength from 700 nm to 3000 nm.

Preferably, the marker has a phosphor emission intensity 50 ms after the excitation is terminated that is at least 37% of its intensity 5 ms after the excitation is terminated.

The first and second types of radiation may independently be applied either by moving the article through a static field of said radiation or by scanning the article with said radiation. Thus a hand-held device could be used to implement the method in order for example to verify security markings on banknotes.

The marker may be disposed directly on the article itself or alternatively the marker may be disposed on a substrate and the substrate directly disposed on the article. For example, the marker could be a marker on a bottle label. The luminescent marker and/or the substrate may be attached by using a binder that is water or alkali soluble.

In a first aspect of the present invention, there is disclosed apparatus for identifying an article marked with a luminescent marker, including:

(a) a conveyor for conveying an article along a path from a first path position to a second path position, (b) a source of a first type of electromagnetic radiation, for supplying said first type of radiation to a first radiation position between the first path position and the second path position, (c) a source of a second type of electromagnetic radiation, for supplying said second type of radiation to a second radiation position between the first radiation position and the second path position, (d) a detector, for detecting radiation emitted from the article when it is between the second radiation and the second path position and thereby identifying the article, and (e) a shield, for shielding the detector from any radiation emitted by the article before it reaches the second radiation position.

The apparatus may additionally include (f) a diverter, for diverting the article from the path depending on its identity.

The conveyor is preferably a conveyor belt.

BRIEF DESCRIPTION OF THE DRAWINGS

A number of preferred embodiments of the invention will now be illustrated with reference to the accompanying drawings, in which.

DETAILED DESCRIPTION OF EXEMPLARY VERSIONS OF THE INVENTION

Figure 1:
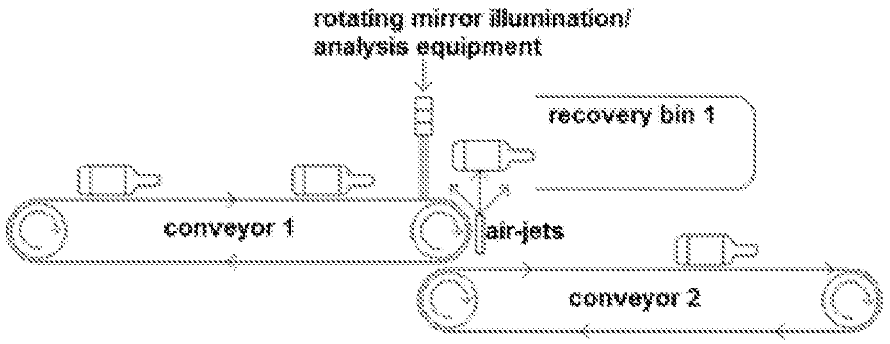
FIG. 1 is a schematic diagram of prior art apparatus for sorting polymeric articles.
Figure 2:
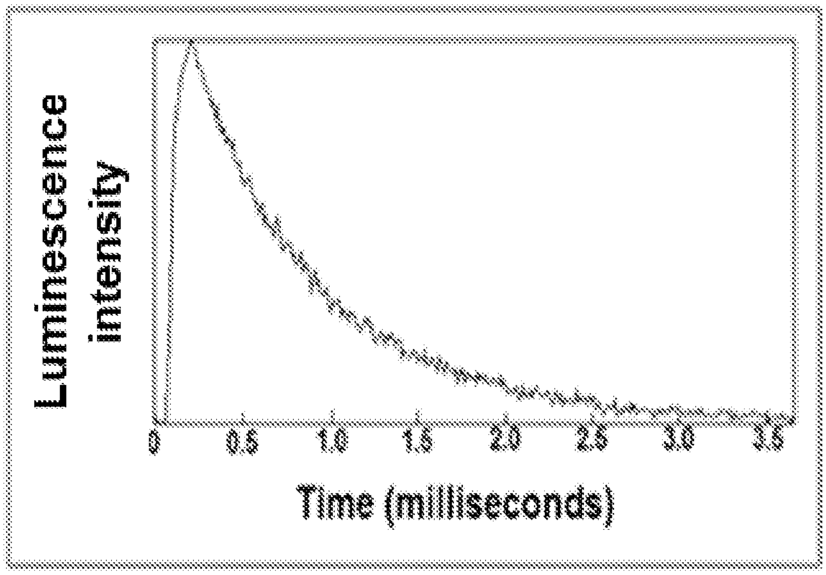
FIG. 2 is a graph showing the decay in luminescence from a $Y_2D_2S$: Eu 3+ phosphor.

The great majority of OBAs and luminescent inks used in commerce are organic materials and have the characteristic that they cease to emit luminescence very quickly after the exciting radiation is switched off, often within nanoseconds. Some inorganic phosphors also respond very quickly like this, but most are slower and their luminescence ceases for example some milliseconds after the excitation source is switched off. The decay time of inorganic phosphors is largely dependent on the activator used with for example $Eu^{3+}$ having decay times (defined as the time to reach 1/e of their initial brightness) of ~1 millisecond, whereas phosphors doped with $Eu^{2+}$ activator are more than an order of magnitude faster. For example FIG. 2 illustrates the decay in luminescence from a $Y_2O_2S:Eu^{3+}$ phosphor.

Codes may be written using luminescent materials (typically inorganic phosphors) that have relatively slow decay times and the exciting radiation is cut off shortly before the article passes beneath the analyser, such that the stray luminescences will have ceased to emit, whereas the luminescent codes are still emitting. Many useful phosphors have decay times in the milliseconds range and at belt speeds of 3 m/s this implies truncating the exciting radiation a matter of a few millimetres before the analyser and given the heterogeneous nature of the articles passing down the line, however, this is not easy to engineer.

Preferably therefore so called long persistence phosphors are used. Such materials have been known for many years, although the precise mechanism by which they work is still not fully understood. They can have decay times of, for example from seconds to several hours. This permits the radiation to be terminated for example 10 cm before the articles pass beneath the analyser, and this is much easier to engineer. Many long persistence phosphors are known that can be excited using visible light, such as violet or blue light. The use of visible excitation sources has a number of substantial advantages. It is much less damaging to human tissue than UV. Because we can see this light it is much easier to prevent excessive exposure. In many cases ambient light will be sufficient to generate luminescence, although exposure to brighter sources will improve signal strength. Because visible light is used in mass market lighting applications, suitable sources are available at relatively low cost.

Additionally, visible light, for example blue, does not excite most OBAs efficiently and so these interferences are substantially reduced.

Long persistence phosphors are in some cases formulated by adding additional dopants to known phosphor compositions. These new dopants are believed to form trapping centres, which effectively store the energy injected by the exciting radiation and release it slowly over a period of time. In other cases, these trapping centres are thought to be formed by defects in the phosphor matrix itself.

A problem with these materials, however, is that too little luminescence is emitted during the ~2-3 milliseconds that the article passes beneath the analyser, and so signal levels are low necessitating the use of higher quantities of phosphor, which increases costs. It is known, however, that the luminescent emission of some of these long persistence phosphor materials can be stimulated promptly using infrared radiation. If they are scanned using an infrared beam they immediately emit the energy stored in the traps as an intense burst of luminescence. It has been realised that this is very convenient in the current application, where a beam of broad band infrared radiation is already scanned across the articles, to facilitate the NIR measurements, and so no new equipment is required to implement the invention.

There are two ways of implementing this process. The first is to print the luminescent code onto the label that is nearly always present. The labels are subsequently removed prior to recycling and so this has the advantage that the recycled material is not contaminated by luminescent material (which might compromise the quality of the recycled material). The label removal process, however, is not 100% efficient and a certain percentage of labels get through.

The second approach that has been promoted is to print the code directly onto the article. As mentioned above, this suffers from the drawback of potential build-up of the luminescent materials in the waste stream. It is also more difficult to read the code if there is a label on top of it. It does have significant advantages, however. A certain percentage of the bottles lose their labels before sorting. For example, shrink wrap labels can come off when the plastic bottles are crushed. Additionally, some articles do not have labels: the product information may be printed directly onto the article.

After sorting the recycled materials are washed in a hot alkali solution. It is common for labels to be attached using alkali-soluble adhesives which are designed to dissolve immediately during this treatment. If the phosphor code is contained within a binder that dissolves in this process then it will be washed out of the material at this stage, which is helpful to both processes. It may also help the valuable components in the phosphors to be recovered and recycled. It is advantageous to use alkali soluble resins as the binder for the luminescent materials so that they can be easily washed off and separated from the material to be recycled.

There are many long-persistent phosphors known in the art. For example, the Phosphor Handbook 2$^{nd}$ Edition (Edited by W. M. Yen, S. Shionoya, and H. Yamamoto, published by CRC Press) lists more than 70 known phosphors with long persistence properties. Ideally the present invention may be applied by making small modifications to existing sorting equipment, and in the following section some examples of how it may be implemented are shown.

A common arrangement, for example widely used by Tomra Sorting plants worldwide, is to use a spot of light from and quartz halogen lamp which is scanned across the conveyor belt. In this case there are two convenient ways in which the invention can be implemented.

Figure 3:
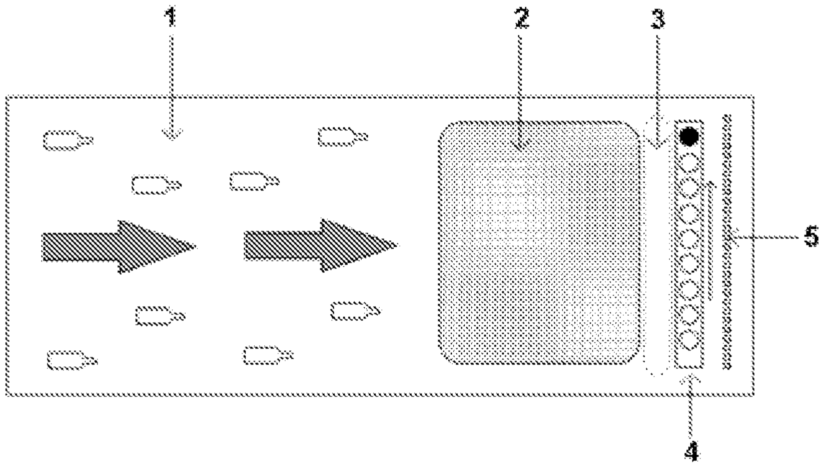
FIG. 3-5 illustrate apparatus for sorting polymeric articles in accordance with the invention.

FIG. 3 illustrates the first in which an area is bathed in UV light of suitable wavelength to excite the phosphor(s) being used. In the diagram 1 is the conveyor belt, 2 is the area bathed in static (i.e. unscanned) UV radiation, 3 is an area that is not bathed in either UV or infrared radiation, 4 is an area scanned by the infrared beam and 5 is an array of air-jets that are used to eject articles identified as having the correct composition.

Figure 4:
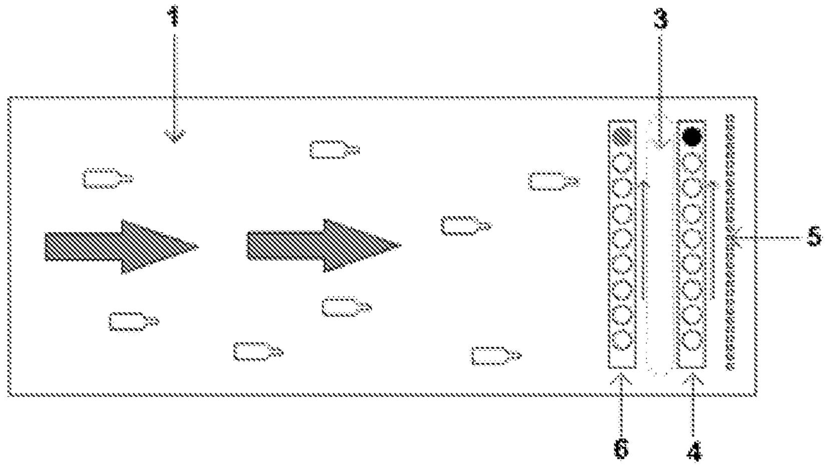

FIG. 4 illustrates a second example of how the technology may be implemented on a system utilising a scanned infrared beam. In this case a spot of UV (6 in the diagram) is scanned in unison, but slightly behind the infrared beam (so that the UV strikes the articles first), ideally utilising the same mirror system employed to scan the infrared beam. Once again the UV beam does not overlap with the infrared beam. In both cases the spectrometer is shielded so that it cannot receive radiation directly from the UV irradiated area, but only from the infrared radiated area.

Quartz halogen lamps are widely used as sources of infrared. These sources also produce visible radiation. Ideally the visible component should be removed before the beam strikes the articles using a long pass filter, which are readily available in commerce (e.g. from Edmund's Optics), otherwise the scattered visible component will compete with the luminescent signals.

Figure 5:
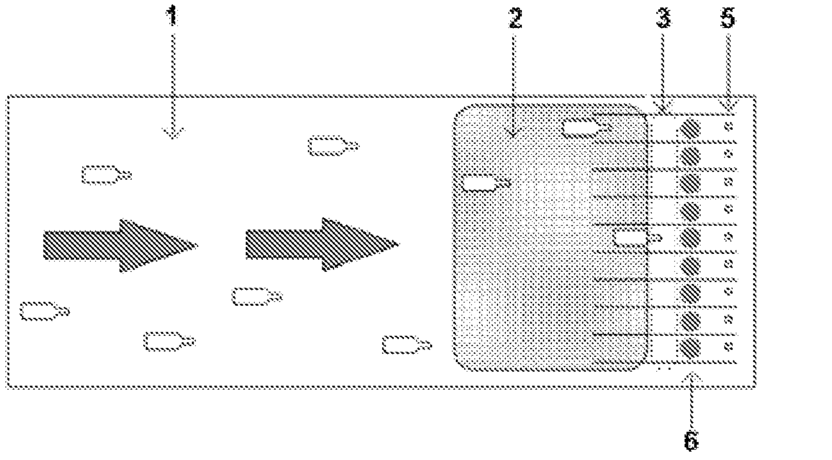

FIG. 5 illustrates another example, in this case for a different sorting system that is in use commercially at the current time. In this case the articles are funneled into channels and irradiated with static infrared beams, 6. The simplest approach in this case is for a static area to be bathed in UV just before the infrared irradiated area is bathed with infrared. Once again there must be a gap between these two areas that is not bathed in either type of beam, and the detection spectrometers must be shielded from luminescence coming directly from the area bathed in UV.

In the foregoing for brevity it has been assumed that the exciting radiation is UV. The exciting radiation is chosen so as to be compatible with the phosphors to be detected and may in fact be UV-A, UV-B, UV-C or indeed visible light since some long persistence phosphors, such as CaS:Eu, may be excited using visible light. Indeed, there are some long-persistence phosphors that are excited by ambient lighting and it is possible to use the infrared stimulated emission process described herein without the need for an addition excitation source.

If phosphors that can be excited using visible light were used then ambient lighting could provide the first radiation source. In practice, however, since the intensity of the light stimulated by the second radiation source is closely related to the excitation intensity then it would be advantageous to use much brighter visible light than is normally present in ambient lighting for the first radiation source. Nevertheless, there are advantages (health and safety, cost) in using visible light rather than ultraviolet.

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

The disclosures in UK patent application number GB1706291.0 from which this application claims priority, and in the abstract accompanying this application are incorporated herein by reference.

The invention claimed is:

1. A method for identifying an article marked with a luminescent marker, including carrying out the following steps in order:

(a) providing an article marked with a luminescent marker which identifies said article, (b) exciting the marker with a first type of electromagnetic radiation in order to store luminescence in said marker, (c) ceasing said exciting step, (d) waiting for a period of time, (e) applying a second type of electromagnetic radiation to the marker in order to release said stored luminescence, and (f) detecting said released luminescence in order to identify said article.

2. A method as claimed in claim 1, wherein:

(a) the first type of electromagnetic radiation has a wavelength from 200 nm to 700 nm, and (b) the second type of electromagnetic radiation has a wavelength from 700 nm to 3000 nm.

3. A method as claimed in claim 1, wherein the luminescent marker includes one or more phosphor markers.

4. A method as claimed in claim 3, wherein said one or more phosphor markers has a phosphor emission intensity 50 ms after the excitation is terminated that is at least 37% of its intensity ims after the excitation is terminated.

5. A method as claimed in claim 1, wherein the first type of radiation is applied either by moving the article through a static field of said radiation or by scanning the article with said radiation.

6. A method as claimed in claim I, wherein the second type of radiation is applied either by moving the article through a static field of said radiation or by scanning the article with said radiation.

7. A method as claimed in claim 1, wherein the article is moved along a path between step (b) and step (f).

8. A method as claimed in claim 7, wherein the article is moved on a conveyor belt.

9. A method as claimed in claim 1, including the step of making a decision regarding recycling of said article based on the identity of the article.

10. A method as claimed in claim wherein the period of time in step (d) is from 1 ms to 5 s.

11. A method as claimed in claim I, including the steps of providing a detector for step (f) and shielding said detector so that it only detects radiation from step (e).

12. A method as claimed in claim 1 wherein:

(a) the marker is disposed on the article itself, or (b) the marker is disposed on a substrate and the substrate is disposed on the article.

13. A method as claimed in claim 12 in which:

(a) the luminescent marker is disposed on the article, or (b) the substrate disposed on the article, using a binder that is water or alkali soluble.

14. Apparatus for identifying an article marked with a luminescent marker, including:

(a) a conveyor for conveying an article along a path from a first path position to a second path position, (b) a source of a first type of electromagnetic radiation, for supplying said first type of radiation to a first radiation position between the first path position and the second path position, wherein the first type of radiation induces storage of luminescence in the article, (c) a source of a second type of electromagnetic radiation, for supplying said second type of radiation to a second radiation position between the first radiation position and the second path position, wherein the second type of radiation induces release of the stored luminescence from the article, (d) a detector, for detecting radiation emitted from the article when it is between the second radiation and the second path position and thereby identifying the article, and (e) a shield, for shielding the detector from any radiation emitted by the article before it reaches the second radiation position.

15. Apparatus as claimed in claim 14, additionally including:

(f) a diverter, for diverting the article from the path depending on its identity.

16. Apparatus as claimed in claim 14, wherein:

(a) the first type of radiation has a wavelength from 200 nm to 700 nm, and (b) the second type of electromagnetic radiation has a wavelength from 700 nm to 3000 nm.

17. Apparatus as claimed in claim 14, wherein the conveyor is a conveyor belt.

* * * * *